United States Patent
Queric

(10) Patent No.: US 9,015,631 B2
(45) Date of Patent: Apr. 21, 2015

(54) ANIMATED ICONS TO PREVIEW TRANSFORMATIONS RELATED TO 3D MODELS

(75) Inventor: Mikael Queric, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 1586 days.

(21) Appl. No.: 12/187,744

(22) Filed: Aug. 7, 2008

(65) Prior Publication Data
US 2010/0037178 A1 Feb. 11, 2010

(51) Int. Cl.
*G06F 3/048* (2013.01)
*G06F 3/0484* (2013.01)

(52) U.S. Cl.
CPC .................................. *G06F 3/04845* (2013.01)

(58) Field of Classification Search
USPC .......... 715/835, 836, 837, 838, 848, 849, 850
See application file for complete search history.

(56) References Cited

U.S. PATENT DOCUMENTS

| | | | |
|---|---|---|---|
| 5,202,828 A | 4/1993 | Vertelney et al. | |
| 5,559,947 A | 9/1996 | Wugofski | |
| 5,644,737 A | 7/1997 | Tuniman et al. | |
| 5,689,286 A | 11/1997 | Wugofski | |
| 5,748,927 A | 5/1998 | Stein et al. | |
| 5,808,613 A * | 9/1998 | Marrin et al. | 715/850 |
| 5,815,152 A | 9/1998 | Collier et al. | |
| 2006/0258447 A1 * | 11/2006 | Baszucki et al. | 463/31 |
| 2008/0098328 A1 * | 4/2008 | Rollin et al. | 715/810 |
| 2010/0179991 A1 * | 7/2010 | Lorch et al. | 709/206 |

OTHER PUBLICATIONS

Roiron, Cyril "Création d'Ileis", Aug. 7, 2008 http://tecfa.unige.ch/~roiron/staf13/fonctions.htm.

* cited by examiner

*Primary Examiner* — Thanh Vu
(74) *Attorney, Agent, or Firm* — Hamilton, Brook, Smith & Reynolds, P.C.

(57) ABSTRACT

An apparatus and a method for using 3D animated icons to preview transformations related to 3D models are disclosed. The apparatus includes a graphical user interface (GUI) which includes a visual depiction of the 3D model as well as a cursor and 3D animated icons which are representative of various transformations that may be performed on the model. The animation of the 3D icons provides the user with a preview, before selecting the icons, of what will happen to the 3D model depicted in the GUI if the transformations are in fact applied by user-selection of the icons. The method includes displaying, on a GUI, a 3D model as well as a cursor and at least one 3D animated icon which displays a representation of a respective transformation. The method further includes changing the state of an animated icon from static (i.e., a still frame) to animated when the user positions the cursor in the neighborhood of the icon, thereby illustrating the effect of the transformation. The method further comprises changing the icon to a different static state whenever the user selects the icon, at which point the icon will be displayed as a still frame that indicates that the icon has been selected.

28 Claims, 12 Drawing Sheets

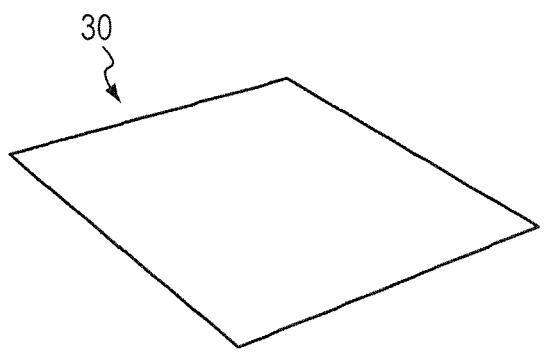
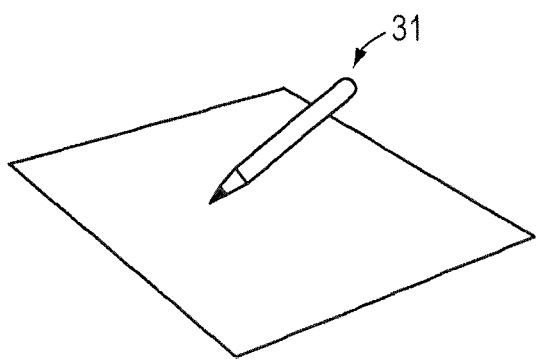
FIG. 3A     FIG. 3B
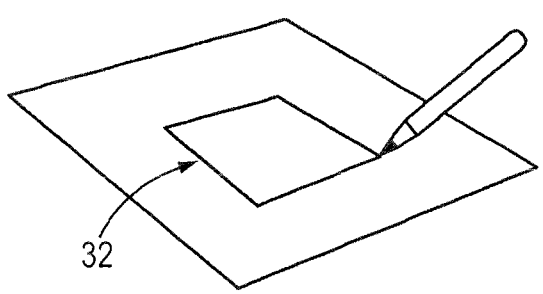
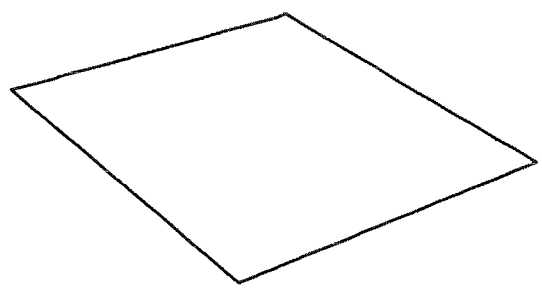
FIG. 3C     FIG. 3D

ANIMATED ICONS TO PREVIEW TRANSFORMATIONS RELATED TO 3D MODELS

FIELD OF THE INVENTION

The present invention relates generally to three-dimensional (3D) computer-aided design (CAD) modeling tools. More specifically, an apparatus and a method for using 3D animated icons to preview modeling operations related to 3D models are disclosed.

BACKGROUND

Description of Related Art

Computer-aided design (CAD) tools enable users to design a variety of objects (e.g., parts, products, and structures) using computer technology. CAD enables users to rapidly design objects in software before having to physically construct them. A CAD model typically consists of one or more objects that are designed virtually and displayed to the user via a graphical visualization that enables the user to fully appreciate the features of the model throughout the process of developing the model. CAD tools enable the drafting of precise engineering drawings for models in two or three dimensions (2D or 3D, respectively).

CAD tools typically include a graphical user interface (GUI) through which the user may interact with the model. The GUI typically includes a visual representation of the object being modeled. The visual representation of the model in the GUI typically enables the user to view the model from various perspectives and to navigate the virtual environment in which the model is situated. This navigation may be further enabled by icons in the GUI which the user may select to change, for example, the aspect angle for viewing the model. The GUI typically includes icons that may be selected to transform the model (e.g., add elements to the model, remove elements from the model, distort, resize, or otherwise change the model in some way). In some cases, clicking (or otherwise selecting) such an icon will immediately execute the transformation (e.g., if the icon represents an "undo" operation that undoes the previous transformation). In other cases, selecting an icon will merely initiate the transformation. For example, resizing an object along one of its dimensions might require the user to first click on the appropriate resize icon, then click on the relevant portion of the object to be resized, and then possibly drag the cursor to resize the object. The ways in which transformational operations are accomplished (i.e., the steps that the user must perform) are not always evident from just viewing static (i.e., non-animated) icons.

Transformational operations are typically more complex in 3D models than in 2D models, due in part to the increased degrees of freedom. For example, whereas the edges of a rectangle may be adjusted in terms of length and width, a 3D rectangular prism has three dimensions which may be adjusted. It is more difficult to display 3D models and associated transformations (as opposed to 2D counterparts) on a flat computer screen. Icons in modeling tool GUIs are correspondingly more complex when dealing with 3D objects than with 2D objects. For example, an icon may enable the user to adjust one edge of a polyhedron and its adjoining faces. This is an operation which is typically difficult to convey with a conventional (static) icon.

Thus, it is desirable to have an apparatus and a method to show the user what a particular 3D modeling transformation will do to the model before the user actually has to initiate and apply the transformation.

SUMMARY OF THE INVENTION

The present invention addresses the foregoing problems. An apparatus and a method for using 3D animated icons to preview transformations related to 3D models are disclosed. Multiple inventive embodiments of the present invention are described below.

The invention apparatus includes a graphical user interface (GUI) which includes a visual depiction of the 3D model and 3D animated icons which are representative of various transformations that may be performed on the model. The 3D animated icons are pedagogical tools to convey to the user the functionality of the particular transformations associated with the icons. The GUI further includes a cursor which is used to navigate the 3D model and to select icons in the GUI. Animation of the 3D icons provides the user with a preview (visual depiction), before selecting the icons, of what would happen to the 3D model depicted in the GUI if the transformations were in fact to be initiated by clicking on the icons. The visual depiction may also show an exemplary object to which the transformation is applied.

The animation of an icon is activated by the user positioning or hovering the cursor near the icon. As is conventional in the art pertaining to icons, "near" in this context is defined by a minimum threshold distance to select the icon. Similarly, the user must hover the cursor near the icon for a minimum threshold duration in order for the animation to be activated. Definition or ranges of such distance thresholds and such time duration thresholds are common in the general art of GUI's and icons therein. When an animated icon is so activated, it enters an animated state, during which the icon is displayed as an animated sequence of frames, with the animated sequence illustrating the transformation associated with the icon.

In a preferred embodiment, the icon is in a first static state when the cursor is not positioned near the icon, and during this state the icon is displayed as a still frame. The icon is in a second static state if the icon is the most recent icon to have been selected by a user, and during this state the icon is displayed as a still frame, different from the still frame of the first static state, identifying the icon as the most recent icon to have been selected.

Any of the transformations "Draw", "Rectangle", "Circle", "Arc", "Push n Pull", "Manipulate", "Paint", or "Grid Options" may be represented as animated 3D icons, and other transformations may be so represented as well.

The invention method includes displaying, on a GUI, a 3D model as well as a cursor and at least one 3D animated icon which displays (visually depicts) a representation of a particular transformation and typically an exemplary object to which the transformation may be applied. The exemplary object need not look like the 3D model currently being designed by the user. The method further includes changing the state of an animated icon from static (i.e., a still initial state frame) to animated when the user positions the cursor near the icon. At this point, the icon will illustrate, via an animation consisting of a sequence of frames, the effect that the transformation associated with the icon would have. The method further comprises changing the icon to a different static state whenever the user clicks on (selects) the icon, at which point the icon will be a still frame that indicates that the icon has been selected. Any of the transformations "Draw", "Rectangle", "Circle", "Arc", "Push n Pull", "Manipulate", "Paint", or "Grid Options" may be represented as animated 3D icons in the method embodiment of the present invention, and other transformations may be so represented as well.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3A-3D illustrate representative frames of the animation of an animated icon of the present invention associated with the transformation by which the user draws rectangles.

DETAILED DESCRIPTION OF THE INVENTION

A description of example embodiments of the invention follows.

Figure 1:
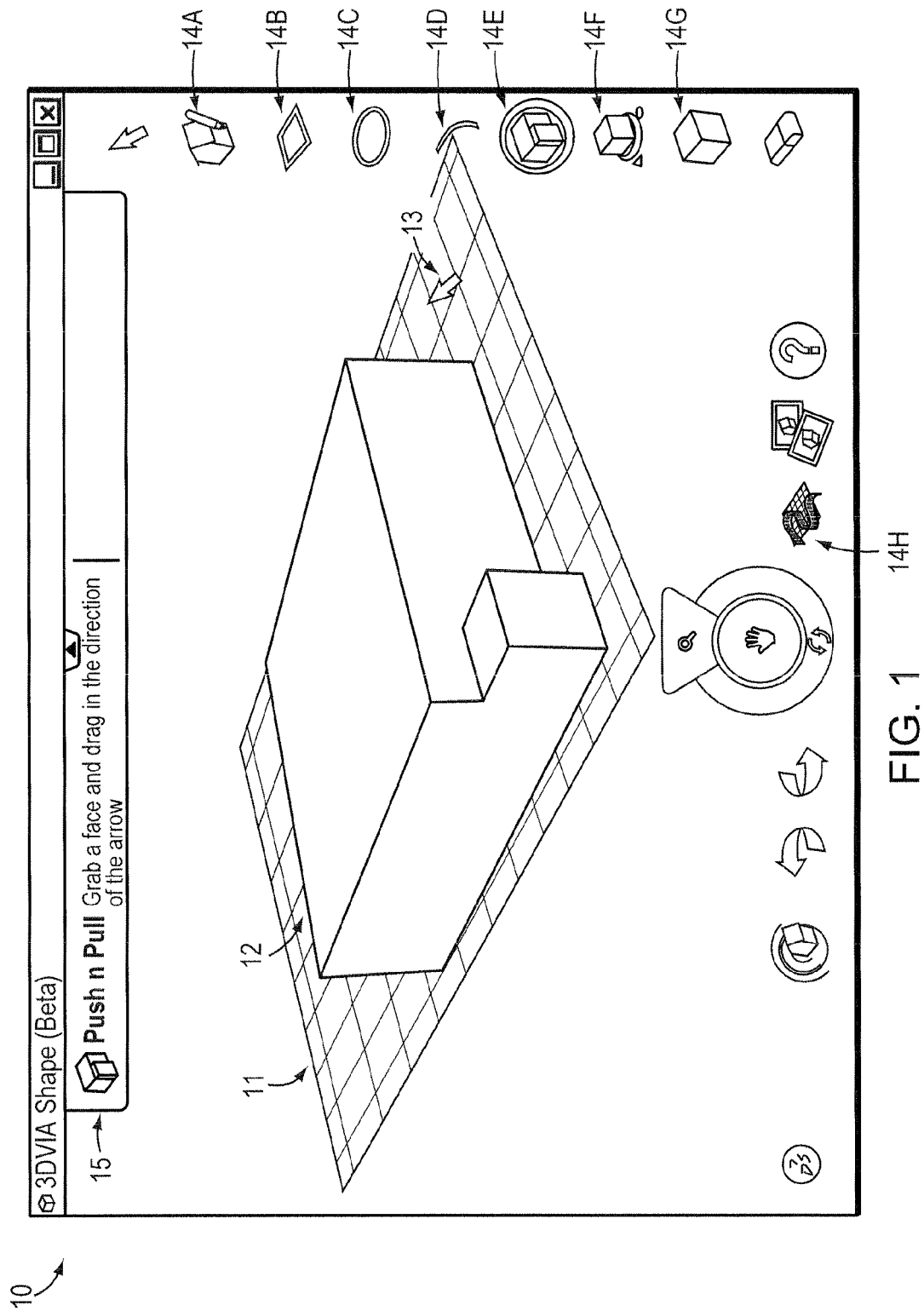
FIG. 1 is a schematic illustration of a representative view of a GUI employing the present invention, including the 3D model, animated 3D icons, and a cursor.

FIG. 1 shows a representative view of the GUI 10 of the present invention, which includes a 3D model 11, animated 3D icons 14A-14H (14 in general), and a cursor 13. A representative object 12 in the 3D model 11 is shown. Text box 15 shows instructions for a particular icon when the icon is clicked (or otherwise user-selected). Several of the animated icons (14A-14H) represent transformations of the 3D model 11 (and/or model object 12) and are described in greater detail below.

The animated icons 14 in the GUI of the present invention are three-dimensional (i.e., having perceptible three-dimensional lighting, shading and form) to enable the user to visualize how the transformations represented by (corresponding to) the icons 14 would apply to the model 11, which is also three-dimensional. Each animated 3D icon 14 has a first static state which is active when the cursor 13 is not positioned near the icon 14 and the icon 14 has not been selected (clicked) by the user. In this static state, the icon 14 typically shows a single frame of an exemplary object (e.g., a polyhedron). When the user positions the cursor 13 near or over the icon 14 (but does not select it), the icon 14 changes to an animated state, in which the icon 14, through an animation, depicts/illustrates the effect of applying, to the exemplary object, the transformation associated with the icon 14. After illustrating the effect of the icon's transformation (operation of the icon 14) via an animation, the icon 14 reverts to the first static state. Such icons 14 are referred to as "animated" icons even when they are not in the animated state.

The foregoing depictions via animated icons 14 convey information related to more than two dimensions. Operations or transformations associated with these icons 14 operate along more than two dimensions as well.

If the user clicks on (or otherwise selects) an icon 14 of the present invention, the transformation associated with the icon is initiated (possibly requiring additional input from the user to complete the transformation), and the icon switches to a second static state. In this second static state, the icon 14 is shown as a single frame (different from the frame of the first static state) which identifies the icon as having been selected.

Several example transformations are described below. It is understood that embodiments of the present invention may have animated icons 14 relating to different 3D transformations than the ones presented below. In the descriptions of animations below, it is understood that only a few frames from the animations are described in detail, and that many more frames are typically used to generate a smooth, continuous animation. It is also understood that alternative animations may be used to convey the same transformations.

Figure 2A:
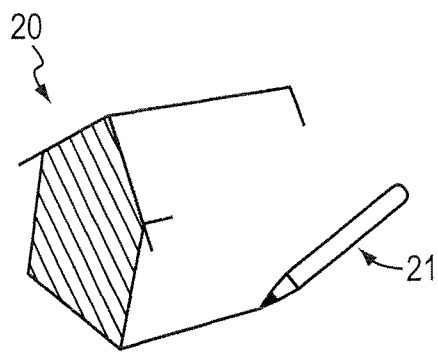
FIGS. 2A-2D illustrate representative frames of the animation of an animated icon of the present invention associated with the transformation by which the user draws lines.
Figure 2B:
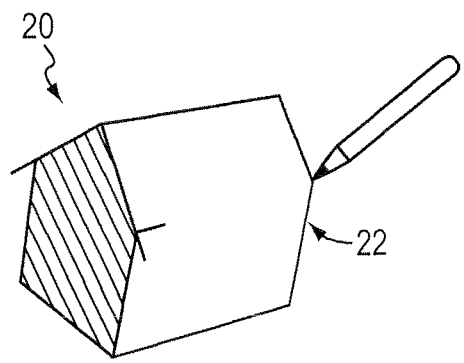
Figure 2C:
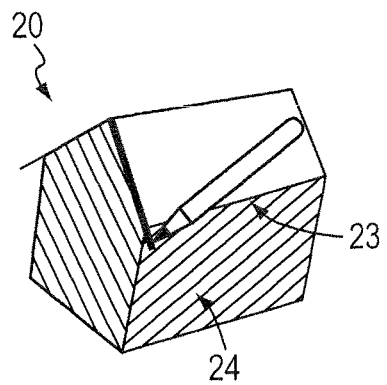
Figure 2D:
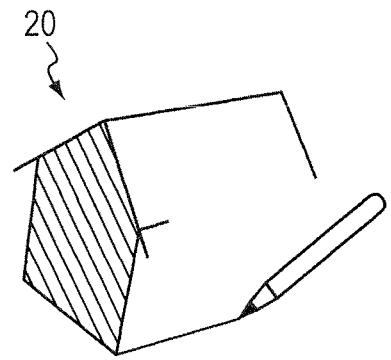

A "Draw" transformation in a 3D modeling system enables the user to draw lines to be added to a 3D model 11. FIGS. 2A-2D shows frames from the animation of icon 14A from FIG. 1. In the frame of FIG. 2A, an illustration of a pencil 21 is shown in an initial position in relation to the 3D icon 20. In a succeeding frame FIG. 2B, the illustrated pencil 21 moves up to draw edge 22. In a further following frame FIG. 2C, the illustrated pencil 21 draws edge 23 and thereby completes face 24. FIG. 2D depicts the ending frame of the animation of the "draw' icon 14A/20 which may be the same as the beginning frame FIG. 2A.

A "Rectangle" transformation in a 3D modeling system enables the user to draw rectangles to be added to a 3D model 11. FIGS. 3A-3D show frames from the animation of icon 14B from FIG. 1. In a first frame FIG. 3A, a first rectangle 30 is shown. In a succeeding frame FIG. 3B, a pencil 31 is illustrated. In a following frame FIG. 3C, the pencil 31 is shown to draw an expanding second rectangle 32. FIG. 3D depicts an ending frame which may be the same as the beginning frame FIG. 3A.

Figure 4A:
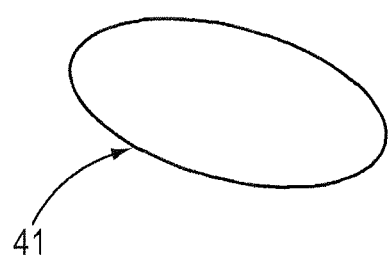
FIGS. 4A-4F illustrate representative frames of the animation of an animated icon of the present invention associated with the transformation by which the user draws circles.
Figure 4B:
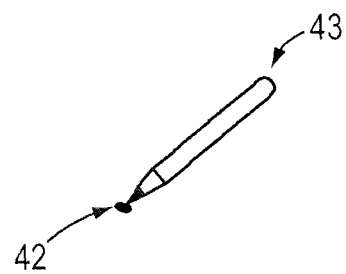
Figure 4C:
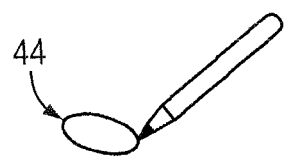
Figure 4D:
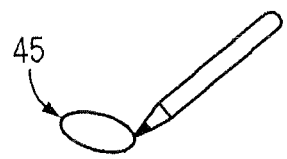
Figure 4E:
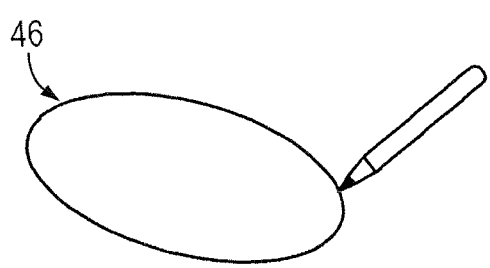
Figure 4F:
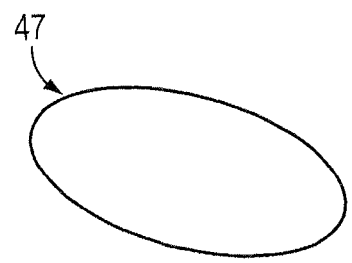

A "Circle" transformation in a 3D modeling system enables the user to draw circles to be added to a 3D model 11. FIGS. 4A-4F show frames from the animation of icon 14C from FIG. 1. In a beginning frame FIG. 4A, a circle 41 is shown. A succeeding frame FIG. 4B shows a pencil 43 beginning the process of generating such a circle, starting at point 42. In a further succeeding frame FIG. 4C, a small circle 44 is shown as the pencil 43 moves outward from point 42. In following frame FIG. 4D, a larger circle 45 is illustrated and is visually larger than prior shown circle 44, and in succeeding frame FIG. 4E, the circle 46 is illustrated as having achieved its maximum (terminal) size. Ending frame FIG. 4F depicts an ending frame which may be the same frame as FIG. 4A, with circle 47 the same size as last exemplified scribed circle 46.

The "Rectangle" and "Circle" transformations are used as the first step in the generation of 3D rectangular prisms and cylinders, respectively, in a 3D model. In particular, rectangles and circles generated by these transformations may be converted into rectangular prisms and cylinders, respectively, using the "Push N Pull" transformation to add the length dimension (i.e., dimension along an axis out of or into the plane of the starting rectangle or circle) as described below.

Figure 5A:
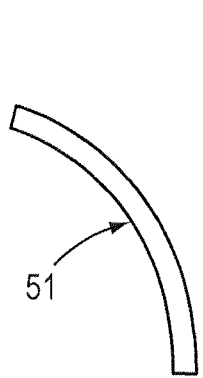
FIGS. 5A-5F illustrate representative frames of the animation of an animated icon of the present invention associated with the transformation by which the user draws arcs.
Figure 5B:
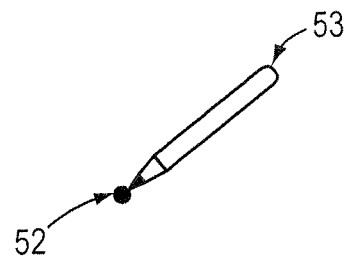
Figure 5C:
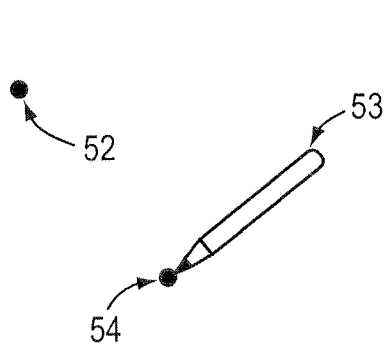
Figure 5D:
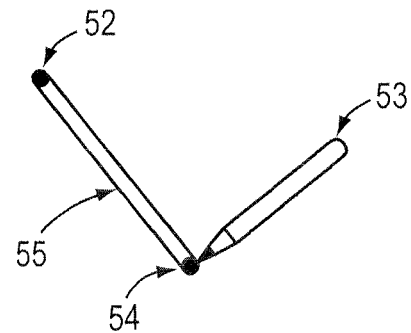
Figure 5E:
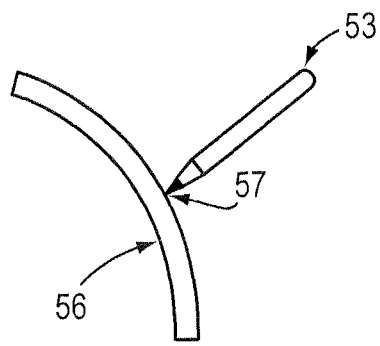
Figure 5F:
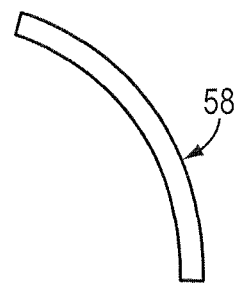

An "Arc" transformation in a 3D modeling system enables the user to draw arcs to be added to a 3D model 11. FIGS. 5A-5F show frames from the animation of icon 14D from FIG. 1. In the frame of FIG. 5A, an arc 51 is shown. Succeeding frame FIG. 5B illustrates a pencil 53 beginning the process of generating such an arc, starting at point 52. In further succeeding frame FIG. 5C, the pencil 53 has moved to point 54. In a following frame of FIG. 5D, a line 55 is connected between the foregoing points 52 and 54, and in FIG. 5E, as the illustrated pencil 53 moves out to point 57, the line 55 is deformed to arc 56. The ending frame FIG. 5F depicts an ending frame which may be the same frame as FIG. 5A, with arc 58 the same size as initial depicted arc 56.

A "Push n Pull" transformation in a 3D modeling system may enable the user to push or pull one face of a modeled object 12, i.e., stretch or compress the object along an axis perpendicular to the face. This may transform a 2D object into a 3D object (e.g., convert a rectangle into a rectangular prism by giving it depth in addition to length and width), or it may stretch or compress the face of an existing 3D object along one axis (e.g., increase/decrease the depth of a rectangular prism). This type of transformation is difficult to visualize using a static icon. An animation (as in the sequence of frames FIGS. 6A-6F, corresponding to icon 14E from FIG. 1) that shows (visually illustrates or otherwise portrays in action) the "Push n Pull" transformation immediately conveys the concept to the user.

Figure 6A:
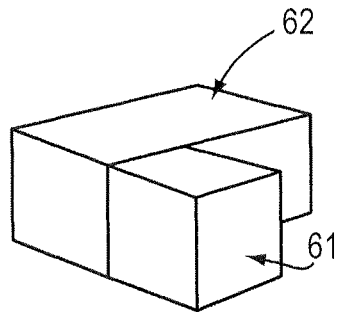
FIGS. 6A-6H illustrate representative frames of the animation of an animated icon of the present invention associated with the transformation by which the user pushes or pulls an object to adjust its size along one of three dimensions.
Figure 6B:
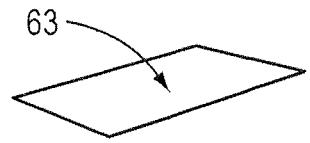
Figure 6C:
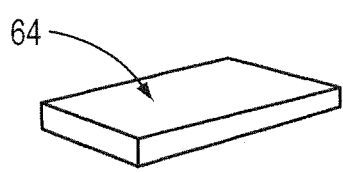
Figure 6D:
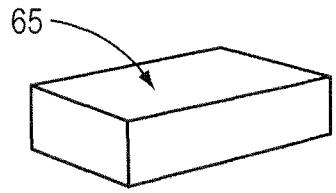
Figure 6E:
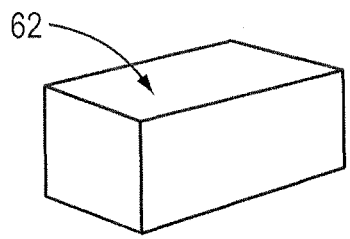
Figure 6F:
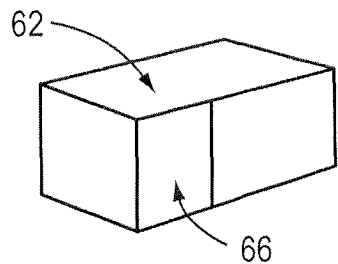
Figure 6G:
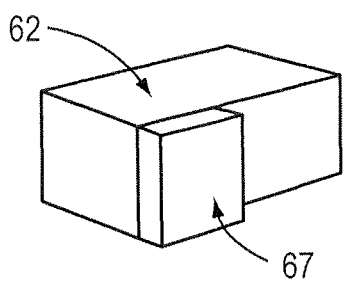
Figure 6H:
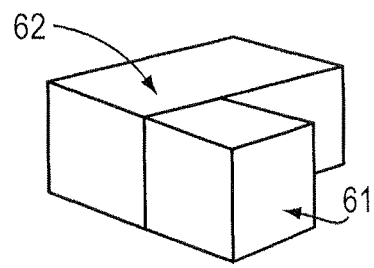

In a starting frame FIG. 6A, a main rectangular prism 62 is shown with an attached rectangular prism 61. The following frames show how this configuration of objects may be built up via "Push n Pull" transformations in two directions. In a following frame FIG. 6B, a rectangle 63 is shown. In succeeding frames FIGS. 6C and 6D, the rectangle 63 of FIG. 6B acquires depth to become rectangular prism 64 and has its depth increased to become rectangular prism 65, respectively. In the next frame FIG. 6E, the rectangular prism 62 has grown to the same size as shown in frame FIG. 6A. In a following frame FIG. 6F, a rectangle 66 is shown on one of the faces of rectangular prism 62. In the next frame FIG. 6G, the rectangle of FIG. 6F acquires depth to become rectangular prism 67. In ending frame FIG. 6H, the depth of rectangular prism 61 has increased further to the same size as in initial frame 6A, whereby ending frame FIG. 6H depicts the same frame as FIG. 6A.

Figure 7A:
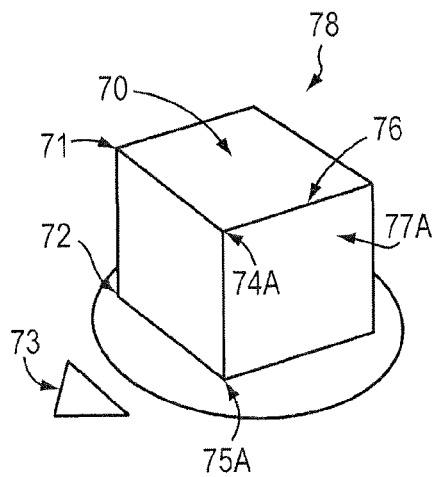
FIGS. 7A-7E illustrate representative frames of the animation of an animated icon of the present invention associated with the transformation by which the user manipulates an object to effect an affine transformation of the object.
Figure 7B:
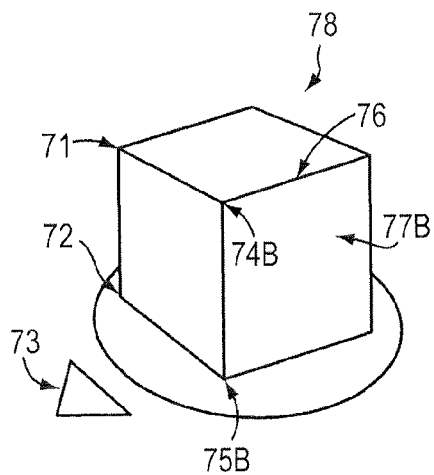
Figure 7C:
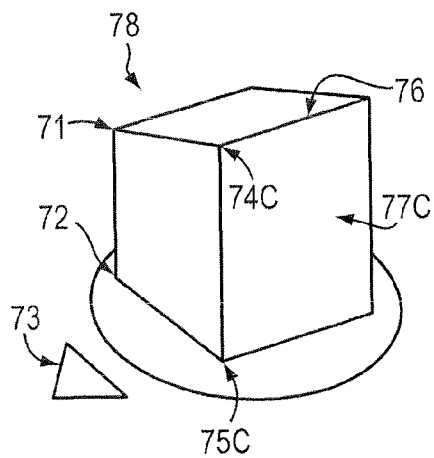
Figure 7D:
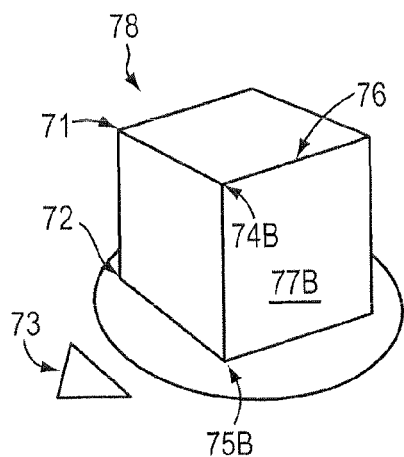
Figure 7E:
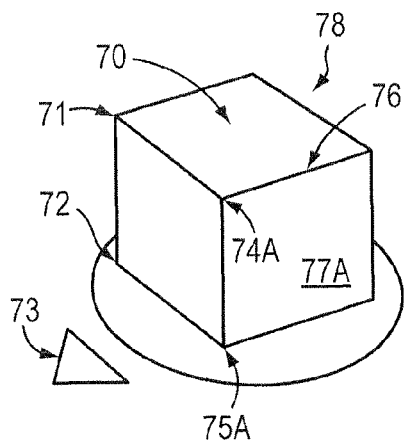

A "Manipulate" transformation in a 3D modeling system may enable the user to apply an affine transformation to a modeled object 12. An affine transformation is composed of zero or more linear transformations (rotations, scaling, or shearing) and zero or more translations (sliding). Thus, a "Manipulate" transformation may translate or rotate a modeled object 12 along an axis, or it may cause the object to be distorted by pulling a point or an edge along an axis. This transformation is particularly difficult to visualize using a static icon because the transformation has multiple distinct manifestations (e.g., translating an entire object vs. distorting a portion thereof by a shear). An animation (as in a sequence of frames FIGS. 7A-7E, corresponding to icon 14F from FIG. 1) that shows (visually illustrates or otherwise portrays in action) an exemplary affine transformation captures the gist of the transformation and enables the user to quickly understand the "Manipulate" transformation. In an initial frame FIG. 7A, a rectangular prism 78 is shown with vertices 71, 72, 74A, 75A, edge 76, and faces 70 and 77A. In a next frame FIG. 7B, as edge 76 is pulled upward, the area of face 77B increases, since the distance between modified vertices 74B and 75B increases even as initial vertices 71 and 72 remain fixed. This process continues in further succeeding frame FIG. 7C with further modified vertices 75C, 75C and growing face 77C. In a following frame FIG. 7D, the process begins to reverse itself, and ending frame FIG. 7E depicts the same frame as FIG. 7A. Marking 73 indicates an axis along which the object may be translated.

Figure 8A:
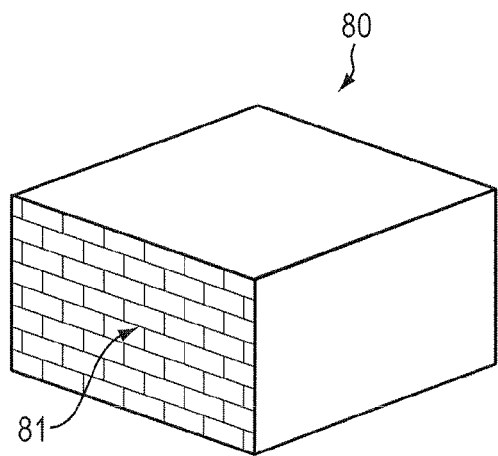
FIGS. 8A-8D illustrate representative frames of the animation of an animated icon of the present invention associated with the transformation by which the user paints (applies) a texture on a face or surface of an object.
Figure 8B:
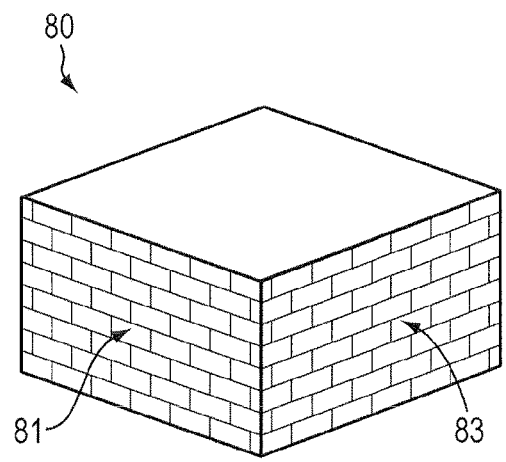
Figure 8C:
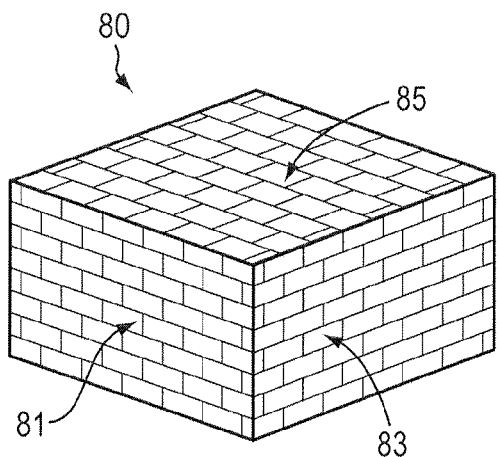
Figure 8D:
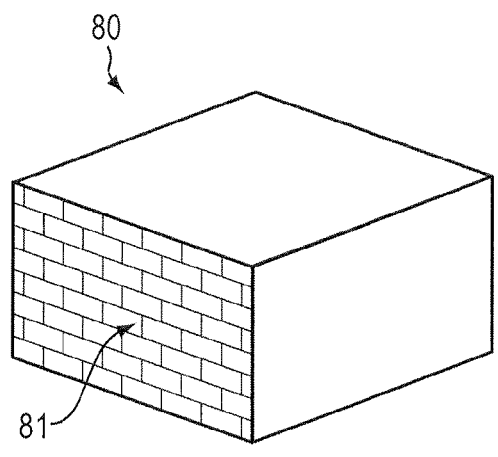

A "Paint" transformation in a 3D modeling system enables the user to paint textures on surfaces/faces of objects 12 in a 3D model 11. FIGS. 8A-8D show a series of frames from the animation of icon 14G from FIG. 1. In initial frame FIG. 8A, a rectangular prism 80 is shown with one face 81 painted with a texture. Succeeding frames FIGS. 8B and 8C show additional faces 83 and 85, respectively, being painted. Ending frame FIG. 8D depicts the same frame as FIG. 8A.

Figure 9A:
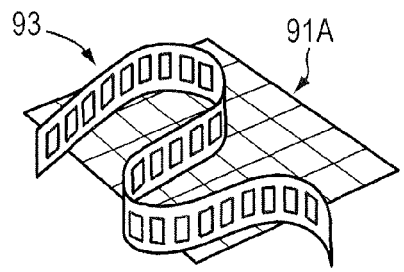
FIGS. 9A-9J illustrate representative frames of the animation of an animated icon of the present invention associated with the transformation by which the user rotates or scales the grid defining the environment in which the 3D model being designed is situated.
Figure 9B:
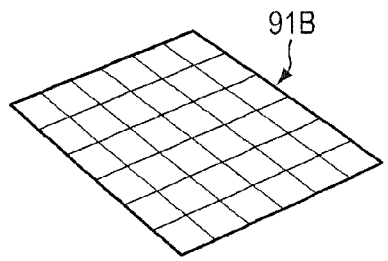
Figure 9C:
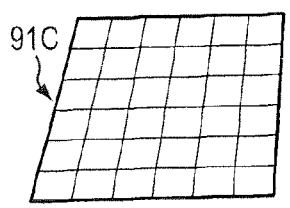
Figure 9D:
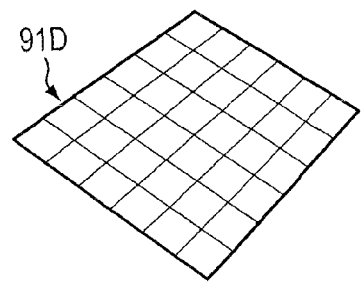
Figure 9E:
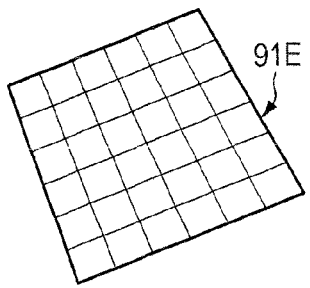
Figure 9F:
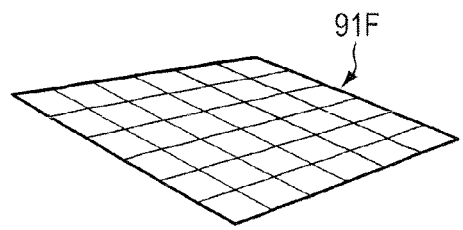
Figure 9G:
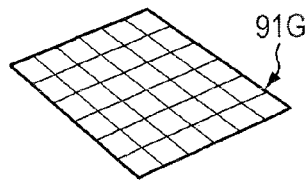
Figure 9H:
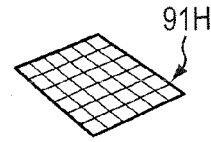
Figure 9I:
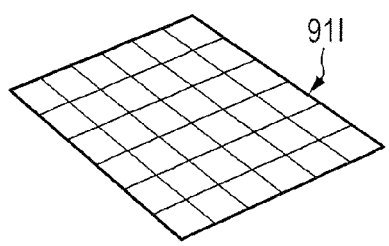
Figure 9J:
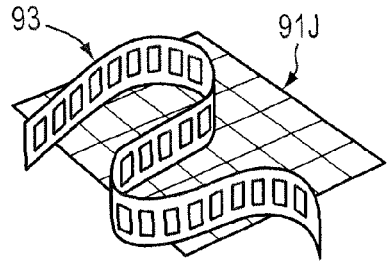

A "Grid Options" transformation in a 3D modeling system enables the user to transform the grid which defines the context in which objects 12 in a 3D model 11 are situated. In this context, the grid may be considered to be part of the 3D model 11. FIGS. 9A-9J show frames from the animation of icon 14H from FIG. 1. In initial frame FIG. 9A, an exemplary object 93 is shown on grid 91A. In a next frame FIG. 9B, just the grid 91B (same as 91A) is shown. In following frames FIGS. 9C-9F, the grid is shown at various stages 91C-91F of a rotation or orientation. Succeeding frames FIGS. 9G and 9H show the grid 91G, 91H being scaled down, and frame FIG. 9I shows the grid being scaled back up. Ending frame FIG. 9J depicts the same grid 91J and exemplary object 93 as in beginning frame FIG. 9A.

Other transformations may add or delete other elements to or from a 3D model 11. Whenever these elements have three-dimensional attributes, showing an example of the transformation in an animated 3D icon 14 that adds or deletes these elements will typically provide greater clarity of functionality to the user than would be possible with a static icon.

Figure 10:
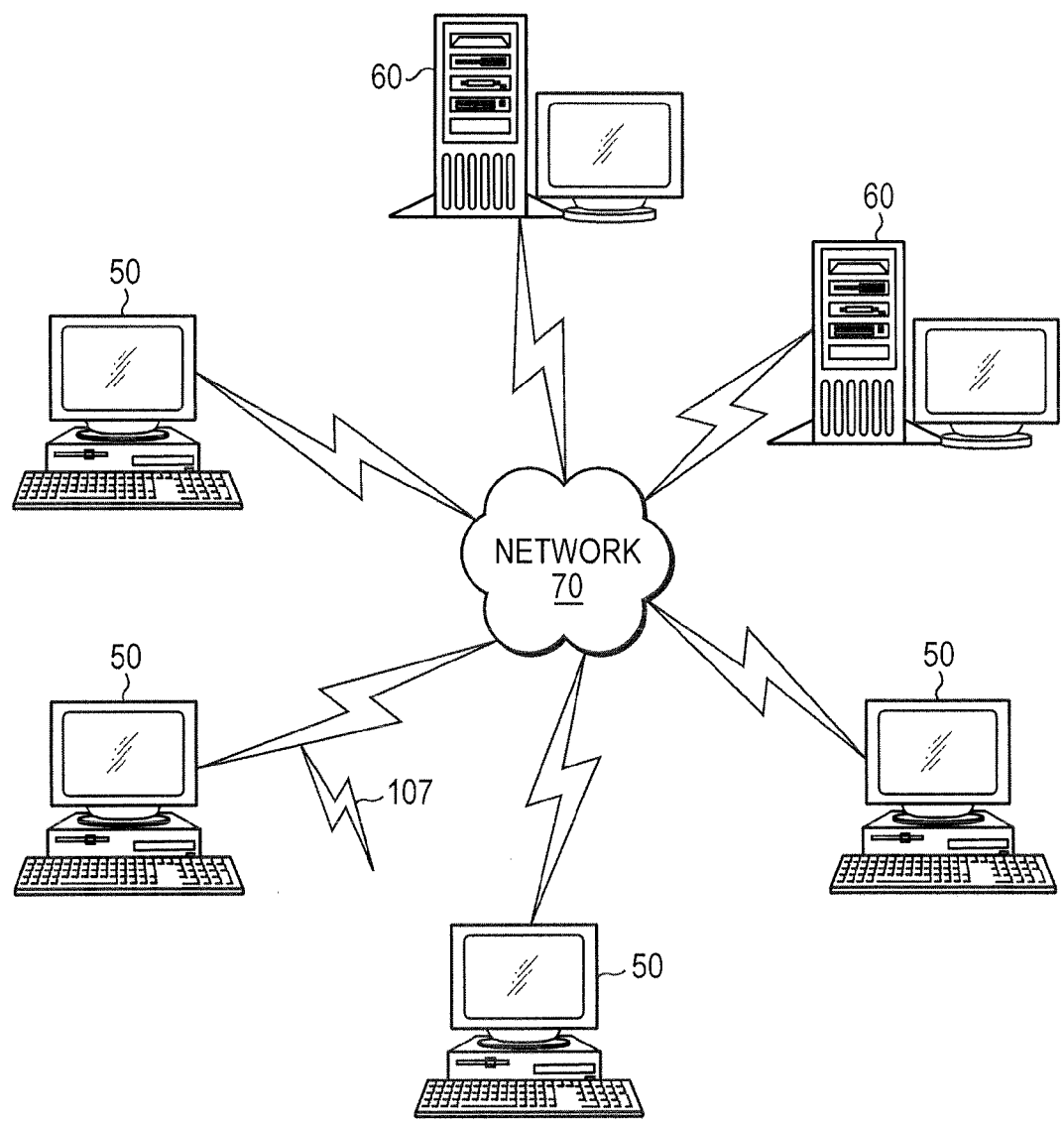
FIG. 10 is a schematic view of a computer network or similar digital processing environment in which the present invention may be implemented.

FIG. 10 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
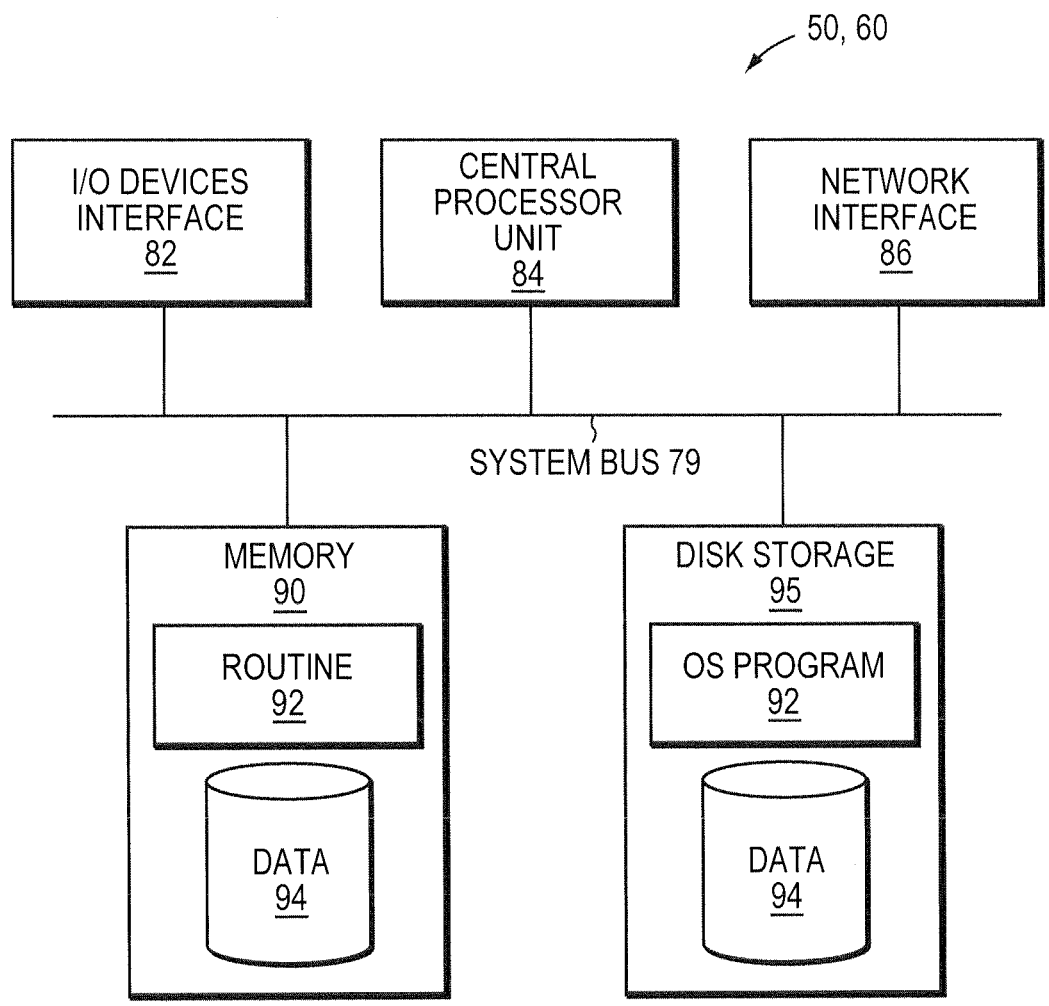
FIG. 11 is a block diagram of the internal structure of a computer in the computer system of FIG. 10.

FIG. 11 is a diagram of the internal structure of a computer (e.g., client processor/device 50 or server computers 60) in the computer system of FIG. 10. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., code for the GUI 10, including the 3D model 11, animated icons 14, and cursor 13, detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 12:
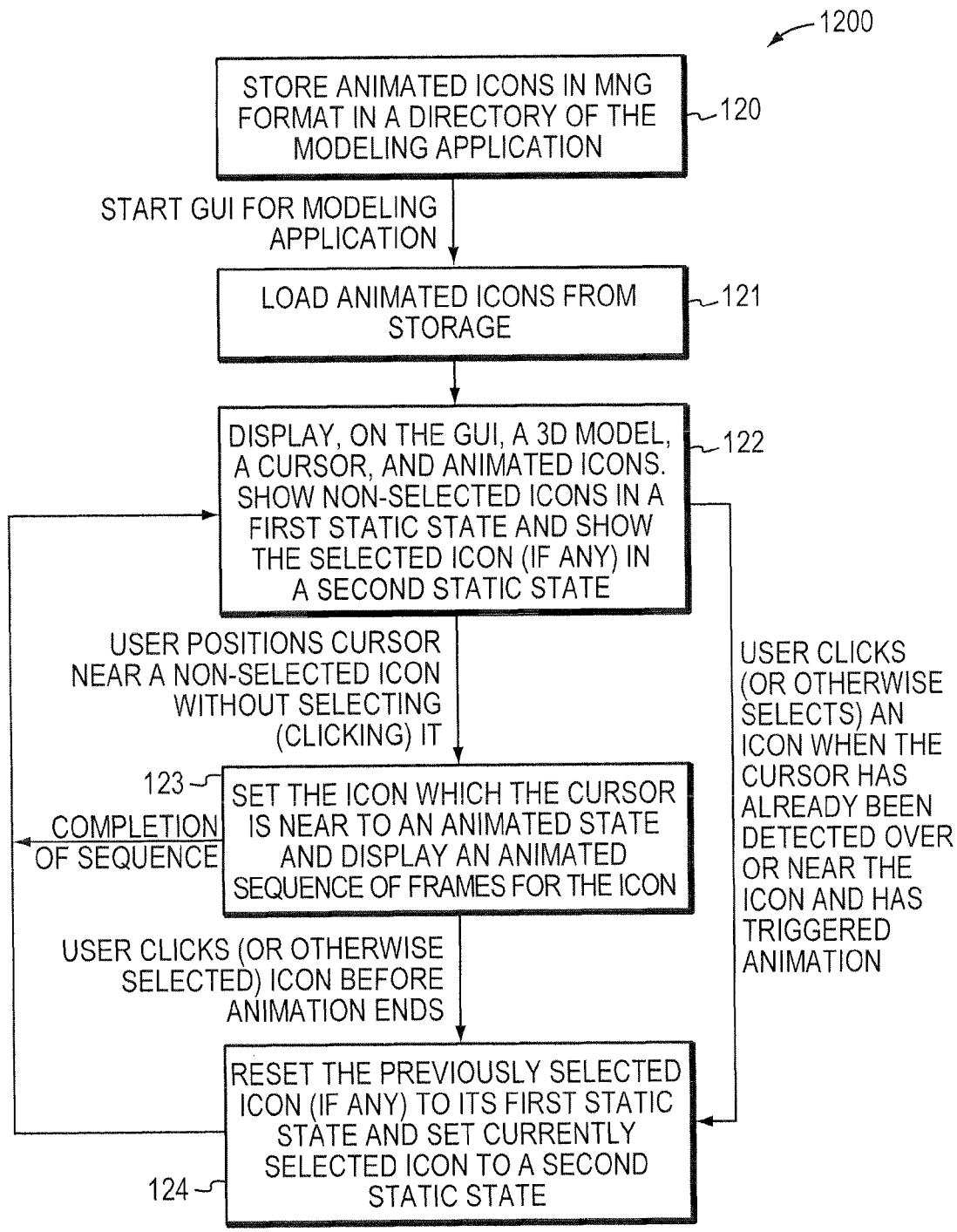
FIG. 12 is a flow diagram of one embodiment of the present invention animated 3D icon

FIG. 12 shows a flow diagram of a computer routine or process 1200 implementing the functioning of the animated icons 14. In beginning step 120, for each animated icon 14, the sequence of frames forming the animated icon 14 is stored in Multiple-Image Network Graphics (MNG) format in a directory of the modeling application. When the GUI 10 for the modeling application is started, the animated icons 14 are loaded from storage (step 121). Then, in step 122, the GUI 10 displays a subject 3D model 11, a cursor 13, and the animated icons 14. Non-selected icons 14 (icons that have not been clicked on or otherwise selected by the user) are shown in a first static state, and if an icon 14 has been selected, it is shown in a second static state.

If the user positions the cursor 13 near a non-selected icon 14 without selecting (e.g., clicking) the icon, that icon is set to an animated state, whereby an animated sequence (animation) of the frames is illustrated (step 123). This animated sequence is rendered using standard techniques associated with the MNG format. In particular, the MNG format displays the icon as a sequence of Portable Network Graphics (PNG) frames. If the animation ends (the sequence of frames is shown to completion) or the user moves the cursor away from the icon during the animation, flow returns to step 122.

If the user clicks (or otherwise selects) the icon which is being displayed as an animation in step 123 before the animation ends, flow moves to step 124, in which the previously selected icon (if any) is reset to its first static state, and the currently selected icon is set to a second static state identifying that the icon is currently selected.

Flow occurs from step 122 to 124 directly (bypassing 123) if the user clicks (or otherwise selects) an icon after process 1200 has detected the cursor is over or near the icon sufficiently to have begun the animation. Flow returns from step 124 to 122.

The process 1200 depicted in FIG. 12 continues until the GUI 10 is shut down. It is understood that this process 1200 describes only events related to the animated icons 14. For example, other events related to the 3D model 11 (e.g., clicking on elements of the model, navigating through the screen, etc.) are not depicted in the diagram but are understood to be supported by techniques known in the art (known for implementing GUI's).

While this invention has been particularly shown and described with references to example embodiments thereof, it will be understood by those skilled in the art that various changes in form and details may be made therein without departing from the scope of the invention encompassed by the appended claims.

What is claimed is:

1. A computer apparatus for previewing transformations in a 3D modeling system, with a graphical user interface (GUI), comprising:
  a visual depiction of a 3D model, including zero, one, or more objects and a grid according to which the objects are positioned;
  at least one animated 3D icon associated with a transformation to the 3D model, wherein the transformation adds an object to the zero, one, or more objects of the 3D model, deletes an object when there are one or more objects in the 3D model, or changes an object when there are one or more objects in the 3D model, wherein the at least one animated 3D icon is user-selectable to apply the associated transformation to the 3D model in a manner that modifies or transforms an object within or added to the visual depiction of the 3D model, the at least one animated 3D icon includes an animated visual depiction of the associated transformation; and
  a cursor which is used to navigate the 3D model and to select the at least one animated 3D icon in the GUI.

2. The apparatus of claim 1, wherein the at least one animated 3D icon further includes an animated visual depiction of the associated transformation on an exemplary object to which the associated transformation may be applied.

3. The apparatus of claim 1, wherein the at least one animated 3D icon enters an animated state if the cursor is moved near the at least one animated 3D icon, during which animated state the at least one animated 3D icon is displayed as an animated sequence of frames, with the animated sequence illustrating the transformation associated with the at least one animated 3D icon.

4. The apparatus of claim 3, wherein the at least one animated 3D icon is in a first static state when the cursor is not positioned near the at least one animated 3D icon, during which first static state the at least one animated 3D icon is displayed as a still frame.

5. The apparatus of claim 4, wherein the at least one animated 3D icon is in a second static state if the at least one animated 3D icon is the most recent animated 3D icon to have been selected, during which second static state the at least one animated 3D icon is displayed as a still frame, different from the still frame of the first static state, identifying the at least one animated 3D icon as the most recent animated 3D icon to have been selected.

6. The apparatus of claim 1, wherein the transformation associated with the at least one animated 3D icon adds at least one line to the 3D model.

7. The apparatus of claim 1, wherein the transformation associated with the at least one animated 3D icon adds a rectangle to the 3D model.

8. The apparatus of claim 1, wherein the transformation associated with the at least one animated 3D icon adds a circle to the 3D model.

9. The apparatus of claim 1, wherein the transformation associated with the at least one animated 3D icon adds an arc to the 3D model.

10. The apparatus of claim 1, wherein the transformation associated with the at least one animated 3D icon pushes or pulls a face of an object in the 3D model, thereby adjusting a size of the object along an axis perpendicular to the face.

11. The apparatus of claim 1, wherein the transformation associated with the at least one animated 3D icon is an affine transformation that is used to manipulate the 3D model.

12. The apparatus of claim 1, wherein the transformation associated with the at least one animated 3D icon adds a texture to the 3D model.

13. The apparatus of claim 1, wherein the transformation associated with the at least one animated 3D icon adjusts the grid associated with the 3D model.

14. A method for conveying to the user of a 3D modeling system a preview of a transformation to a 3D model, comprising:
displaying, on a graphical user interface (GUI), a visual depiction of a 3D model, including zero, one, or more objects and a grid according to which the objects are positioned;
displaying, on the GUI, at least one animated 3D icon associated with a transformation to the 3D model, wherein the transformation adds an object to the zero, one, or more objects of the 3D model, deletes an object when there are one or more objects in the 3D model, or changes an object when there are one or more objects in the 3D model, wherein the at least one animated 3D icon is user-selectable to apply the associated transformation to the 3D model including modifying or transforming an object within or added to the visual depiction of the 3D model, and wherein the at least one animated 3D icon includes an animated visual depiction of the associated transformation; and
providing the user with a cursor in the GUI, wherein the cursor is used to navigate the 3D model and to select the at least one animated 3D icon in the GUI.

15. The method of claim 14, wherein the at least one animated 3D icon further includes an animated visual depiction of the associated transformation on an exemplary object.

16. The method of claim 14, further comprising the step of changing the at least one animated 3D icon to an animated state if the cursor is moved near the at least one animated 3D icon, during which animated state the at least one animated 3D icon is displayed as an animated sequence of frames, with the animated sequence illustrating the transformation associated with the at least one animated 3D icon.

17. The method of claim 16, further comprising the step of setting the at least one animated 3D icon to a first static state when the cursor is not positioned over the at least one animated 3D icon, during which first static state the at least one animated 3D icon is displayed as a still frame.

18. The method of claim 17, further comprising the step of setting the at least one animated 3D icon to a second static state if the at least one animated 3D icon is the most recent animated 3D icon to have been selected, during which second static state the at least one animated 3D icon is displayed as a still frame, different from the still frame of the first static state, identifying the at least one animated 3D icon as the most recent animated 3D icon to have been selected.

19. The method of claim 14, wherein the transformation associated with the at least one animated 3D icon adds one or more lines to the 3D model.

20. The method of claim 14, wherein the transformation associated with the at least one animated 3D icon adds a rectangle to the 3D model.

21. The method of claim 14, wherein the transformation associated with the at least one animated 3D icon adds a circle to the 3D model.

22. The method of claim 14, wherein the transformation associated with the at least one animated 3D icon adds an arc to the 3D model.

23. The method of claim 14, wherein the transformation associated with the at least one animated 3D icon pushes or pulls a face of an object in the 3D model, thereby adjusting a size of the object along an axis perpendicular to the face.

24. The method of claim 14, wherein the transformation associated with the at least one animated 3D icon is an affine transformation that is used to manipulate the 3D model.

25. The method of claim 14, wherein the transformation associated with the at least one animated 3D icon adds a texture to the 3D model.

26. The method of claim 14, wherein the transformation associated with the at least one animated 3D icon adjusts the grid associated with the 3D model.

27. A computer network comprising:
at least one computer configured to provide a preview of one or more transformations of a 3D model, said computer comprising:
a memory configured to store data representative of the 3D model and at least one animated 3D icon, wherein the 3D icon is associated with a transformation of the 3D model, wherein the transformation adds, deletes, or changes an object of the 3D model; and
a processor operatively coupled to said memory and configured to cause a display device to display, within a graphical user interface:
a visual depiction of the 3D model and a grid according to which an object of the 3D model is positioned;
the at least one animated 3D icon, wherein the at least one animated 3D icon is user-selectable to apply the associated transformation to the 3D model in a manner modifying or transforming object properties of the depicted 3D model, the at least one animated 3D icon including an animated visual depiction of the associated transformation; and a cursor which is used to navigate the 3D model and to select the at least one animated 3D icon.

28. A computer apparatus for previewing transformations in a 3D modeling system, with a graphical user interface (GUI), comprising:

a visual depiction of a 3D model, including one or more objects and a grid according to which the objects are positioned;

at least one animated 3D icon associated with a transformation of the 3D model, wherein the transformation adds an object to the one or more objects of the 3D model, deletes an object from the one or more objects from the 3D model, or changes properties of the one or more objects of the 3D model, wherein the at least one animated 3D icon is user-selectable to apply the associated transformation to the 3D model in a manner that modifies or transforms one or more objects within the visual depiction of the 3D model and the at least one animated 3D icon includes an animated visual depiction of the associated transformation; and a cursor which is used to navigate the 3D model and to select the at least one animated 3D icon in the GUI.

* * * * *